United States Patent [19]

Oetiker

[11] 4,312,101

[45] Jan. 26, 1982

[54] HOSE CLAMP WITH INSERT MEMBER

[76] Inventor: Hans Oetiker, Oberdorfstrasse 21, Horgen, Switzerland

[21] Appl. No.: 945,835

[22] Filed: Sep. 26, 1978

[51] Int. Cl.³ .............................................. B65D 63/02
[52] U.S. Cl. ............................... 24/20 R; 24/20 CW
[58] Field of Search ............... 24/20 R, 20 CW, 16 R; 285/243, 252, 256

[56] References Cited

U.S. PATENT DOCUMENTS

| | | | |
|---|---|---|---|
| 3,082,498 | 3/1963 | Oetiker | 24/20 CW |
| 3,303,669 | 2/1967 | Oetiker | 24/20 R X |
| 3,789,463 | 2/1974 | Oetiker | 24/20 CW |

FOREIGN PATENT DOCUMENTS

| | | | |
|---|---|---|---|
| 680662 | 1/1930 | France | 24/20 R |
| 556998 | 12/1974 | Switzerland | |

*Primary Examiner*—Philip C. Kannan
*Attorney, Agent, or Firm*—Craig and Antonelli

[57] ABSTRACT

An insert ring for use with a hose clamp of the type provided with a circumferential band portion and with at least one ear projecting outwardly from the band and adapted to be deformed so as to tighten the clamp about the object to be fastened; the insert ring is so constructed and arranged as to prevent the portion of the insert ring underneath a respective ear from escaping outwardly into the opening within the area underneath the ear during contraction of the latter to thereby prevent any leakage within that area of the ear.

28 Claims, 29 Drawing Figures

HOSE CLAMP WITH INSERT MEMBER

The present invention relates to an insert member for a hose clamp and to the assembly of a hose clamp and of such insert member.

Hose clamps of the type which include one or several deformable ears each consisting of two generally outwardly projecting leg portions interconnected by a generally circumferentially extending connecting portion and which are frequently referred to as so-called "Oetiker" clamps due to this particular ear configuration are known in the art, for example, as disclosed in my U.S. Pat. Nos. 2,614,304 and 3,082,498.

To assure that such clamps hold the hoses tightly on nipples under all operating circumstances without danger of any leaks that might result from hose material being squeezed or permitted to escape radially outwardly into the opening underneath the ear, various proposals have been made in the prior art, such as the use of a wire insert (Swiss Patent No. 401,611), the use of an insert member provided with an inwardly protruding circumferential groove (U.S. Pat. No. 3,303,669) and the use of bridging members adapted to be clipped onto the clamp to bridge the opening underneath the ear (U.S. Pat. No. 3,789,463). These prior art proposals proved very satisfactory under most operating conditions but entailed certain limitations as to the type and/or thickness of the material which could be used therefor.

It is well known that natural rubber and similar rubber-like materials offer the advantage for hoses that they are extraordinarily elastic, and for that reason can be easily tightened onto a nipple since they can be readily deformed in all open places due to their inherent elasticity; however, natural rubber cannot be used in many applications because of its lack of resistance with respect to the fluids it is supposed to carry such as oil, acids and the like and/or because of its lack of heat-resistance. Accordingly, synthetic plastic materials have found ever-increasing applications because they offer extremely good properties, such as immunity to a large number of products attacking rubber and high heat-resistance over wide temperature ranges from, for example, about −40° to about 212° F. without change in their Shore hardness. Even though these synthetic plastic materials thus offer significant advantages in the aforementioned respects, they entail the disadvantage of frequently involving certain problems in the attempt of fastening the same onto nipples without the danger of leaks, especially at higher pressures.

Added thereto is the ever-existing desire to be able to utilize materials for the clamps and especially also for any insert members which permit a reduction in cost. Hence, a reduction in the thickness of the material which can be used for ring-like insert members continues to be a highly desirable goal. However, the thinner the material for the insert member, the greater the problem to prevent it from being displaced or squeezed into the opening underneath the ear when the latter is being deformed to tighten the clamp, and thus to prevent any non-tightness in those places where a more or less narrow gap is permitted to form between the nipple and the hose. In that connection, absolute tightness is a strict prerequisite in numerous applications, such as, for instance, in gasoline lines for internal combustion engines of motor vehicles.

The present invention is concerned with the task to eliminate the aforementioned problems and shortcomings encountered in the prior art and to provide an insert member which prevents with certainty any leakages within the area underneath the ear, even if relatively thin band material is used.

The underlying problems are solved according to the present invention in that means are provided in the ring-like insert member which prevent the portion of the insert member lying underneath the ear from escaping outwardly into the opening within the area of the ear during contraction of the latter to thereby prevent any leakage within that area.

According to one embodiment in accordance with the present invention, especially with the use of relatively thin band material for the ring-like insert member, the insert member is provided with at least one outwardly protruding embossment extending generally in the circumferential direction and adapted to be pressed firmly inwardly, when placed underneath the opening of an ear, by the corner portions forming the transitions from the respective ear into the band portion of the hose clamp during deformation of the ear when forcing the corner portions toward one another. If the ear is provided with an inwardly protruding reinforcing groove extending in the circumferential direction within the connecting portion thereof, it may be appropriate to provide two axially spaced embossments located on both sides of the plane containing the reinforcing groove so as to preclude any interference between the inwardly protruding reinforcing groove of the ear and the outwardly protruding embossments in the insert ring. The embossment or embossments are preferably of a length in the circumferential direction matched to the width of the circumferential opening in the ear, when the ear is in the uncontracted condition, and preferably do not exceed the width of this circumferential opening but are slightly shorter to provide a self-centering action for the embossment relative to the ear and therewith for the insert member relative to the hose clamp. Moreover, the embossment or embossments are preferably located asymmetrically to the center of the insert ring, i.e., are located nearer one end of the ring than the other so that the area of the mechanical interlock of the clamp, as described in U.S. Pat. No. 3,286,314, is covered to assure complete tightness also within that area.

In another embodiment according to the present invention, the open ring-like insert member may be of a type such that one end is provided with two leg portions defining therebetween an elongated opening, into which the tongue portion circumferentially extending from the other end of the ring is able to slide during tightening of the clamp by contraction of the ear. Such an arrangement offers the advantage of a ring-like insert member which is able to maintain a practically perfect circular configuration during the tightening of the clamp. The insert member may thereby be provided with a centrally located inwardly projecting indentation extending from the inner end of the opening over the entire circumference of the ring including the tongue portion. Moreover, within the area of the elongated opening, similar inwardly protruding indentations may be provided in each leg portion which extend at least over a portion of each leg to a point beyond the inner end of the opening. Finally, the outer ends of the leg portions may be interconnected by a web portion of complementary configuration to the cross section of the tongue portion, whereby a spreading-apart of the leg portions is avoided with certainty.

In still another embodiment of the present invention, the ring-like insert member is no longer of relatively thin band-like material but is made from wire-like material of solid cross section, for example, of circular, oval, square, rectangular or similar cross section. By displacing some of the ring material radially outwardly within a predetermined area, for example, by flattening the ring-like insert member of circular cross section within a limited area utilizing conventional cold deformation techniques, a segment-like external configuration of the insert ring can be realized within that area which fulfills the same purpose as the embossment in the first-mentioned embodiment.

In still another embodiment of the present invention, outwardly extending point-like projections or knob-like protrusions, made by cold-deformation, are provided in the insert ring, which are spaced from one another in the circumferential direction a distance approximately equal to, but again preferably slightly smaller than the opening underneath the uncontracted ear so that the insert member is being pressed inwardly by engagement of the corner portions forming the transitions from the respective ear into the band portion with these projections or protrusions, when the ear is being deformed by forcing the corner portions toward one another.

In still a further embodiment of the present invention, the ring-like insert member may be provided with several openings spaced in the circumferential direction so that upon tightening of the clamp, the hose material is being forced into these openings and thereby anchors the insert member against relative movement with respect to the hose material. The insert member may be made of any suitable bendable material such as synthetic plastics, sheet metal material, carbon or stainless steel and the like and may be of crescent-like configuration or of band-like material of suitable thickness. Such an arrangement will also prevent the insert member from being squeezed out into the ear, especially if thin material is used for the insert member.

To prevent axial movement between the insert member and the clamp member, various alternatives are proposed by the present invention. According to one proposal of this invention, the insert member is made wider than the clamp and its side portions are bent outwardly at an angle to the axial direction. In the alternative, if the insert member is of lesser width than the clamp, the clamp may be provided with inwardly extending, point-like projections or knob-like protrusions, made by cold deformation, which are so spaced in the axial direction that the insert member can be accommodated and held therebetween.

Accordingly, it is an object of the present invention to provide a ring-like insert member and hose clamp-insert member assembly which avoids by simple means the aforementioned shortcomings and drawbacks encountered in the prior art.

Another object of the present invention resides in an insert member and hose clamp-insert member assembly which reliably precludes any leakage even with the use of relatively hard plastic hose materials and/or thin insert ring materials.

A further object of the present invention resides in an insert ring and hose clamp-insert ring assembly which can be manufactured in a relatively inexpensive manner by simple means utilizing relatively inexpensive materials.

A still further object of the present invention resides in a ring-like insert member and hose clamp-insert member assembly which are capable of fulfilling all of the aforementioned aims and objects in a satisfactory manner, yet preclude damage to the hose material in the installed, tightened condition and are capable of withstanding relatively high pressures.

These and other objects, features and advantages of the present invention will become more apparent from the following description when taken in connection with the accompanying drawing which shows, for purposes of illustration only, several embodiments in accordance with the present invention, and wherein.

Figure 1A:
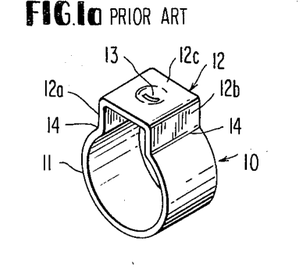
FIG. 1a is a perspective view of a typical prior art hose clamp of the so-called "Oetiker" type.
Figure 1B:
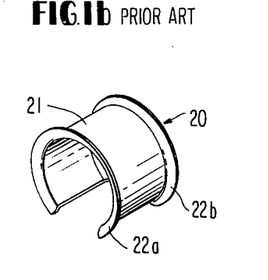
FIG. 1b is a perspective view of a typical ring-like insert member as used in the prior art.
Figure 2:
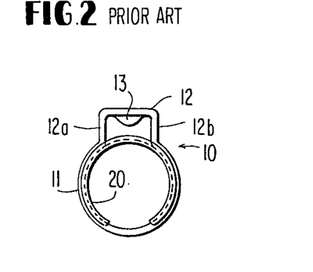
FIG. 2 is an axial elevational view of the hose clamp and insert ring of FIGS. 1a and 1b in the assembled condition with the ear still non-contracted.

Referring now to the drawing wherein like reference numerals are used throughout the various views to designate like parts, and more particularly to FIGS. 1a, 1b and 2, reference numeral 10 generally designates therein a typical so-called "Oetiker" one-ear clamp consisting of a flat band portion 11 and of an ear generally designated by reference numeral 12 which is formed by two generally outwardly extending leg portions 12a and 12b interconnected by a connecting portion 12c. A reinforcing groove 13 extending in the circumferential direction is provided in the connecting portion 12c.

Figure 3:
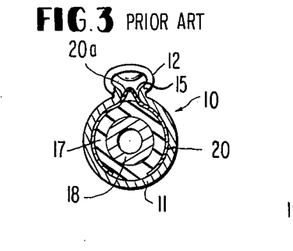
FIG. 3 is a cross-sectional view, similar to FIG. 2, illustrating the various prior art parts in the installed condition, when for purposes of tightening the hose onto a nipple, the ear of the clamp has been contracted by plastic deformation of the ear.
Figure 4:
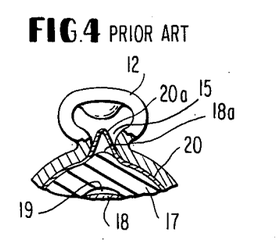
FIG. 4 is a view, similar to FIG. 3 and illustrating, on an enlarged scale, the details of the various parts in the installed condition of the assembly with the ear of the clamp contracted.

The prior art insert ring of FIG. 1b, generally designated by reference numeral 20 consists of a ring portion 21 made of a flat band material. To retain the flat band portion 21 axially in place in the preassembled condition (FIG. 2), bent-up side portions 22a and 22b are provided. While the insert ring 20 of FIG. 1b proved quite satisfactory with the use of suitable material, for example, with a band material having a thickness of 0.50 mm., problems arise with the use of a thinner band material, for example, having a thickness of about 0.25 mm. because the portion of the insert ring then located underneath the ear 12 of the hose clamp 10 is likely to be squeezed into the opening 15 underneath the ear 12, as shown in FIGS. 3 and 4, when the latter is contracted by deformation. If the insert ring 20 is caused to be squeezed outwardly with its part 20a through the opening 15 into the ear, then the hose 17 mounted on a nipple 18 will more or less follow the displacement of the insert ring 20—at least to some extent—as indicated at 18a (FIG. 4) thereby causing a leakage place schematically indicated by the area 19.

Figure 6:
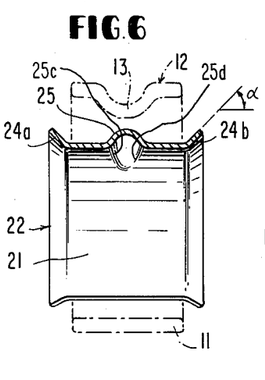
FIG. 6 is a cross-sectional view, on an enlarged scale, taken along line VI—VI of FIG. 5.
Figure 7:
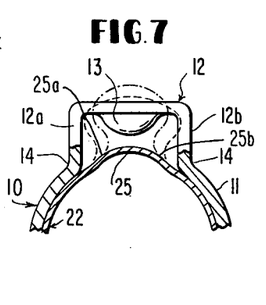
FIG. 7 is a partial elevational view, partly in cross section and on an enlarged scale, of a ring-like insert member in accordance with the present invention in use with a hose clamp of the type shown in FIG. 1a, and illustrating the progressive displacement of the parts during the closing operation of the ear.

To eliminate this shortcoming of the prior art, the ring-like insert member in accordance with the present invention, as shown in FIG. 5, where it is again generally designated by reference numeral 20, is provided with an outwardly extending embossment 25 which is of such length in the circumferential direction as corresponds approximately to the opening underneath an ear in the uncontracted condition of the latter. As mentioned above, the length of the embossment 25 in the circumferential direction, however, is preferably smaller than the opening in the uncontracted ear so as to provide a certain self-centering of the insert member relative to the clamp. The embossment 25 should thereby preferably be such that the corner portions 14 (FIGS. 1 and 7) representing the transitions from the outwardly extending leg portions 12a and 12b into the circumferential band portion 11, will ride up on the gradually rising and widening external surfaces 25a and 25b (FIG. 7) and 25c and 25d (FIG. 6) of the embossment 25 when the ear is being deformed to tighten the clamp, by forcing the corner portions 14 toward one another, and will thereby not only prevent the insert ring 20 from being squeezed into the opening 15 but will actually press the insert ring 20 inwardly, thereby assisting the realization of a fluid-tight connection even at relatively high pressures. As can be seen from the drawing, this is achieved by the particular configuration of the external surfaces of the embossment 25 which resemble the external surfaces of a part of an egg in that they gradually increase in height in the radially outward direction as viewed in longitudinal cross section (FIG. 7) in which these surfaces are designated by reference numerals 25a and 25b, and in that they also gradually widen in the axial direction, as shown in transverse cross section (FIG. 6) in which these surfaces are designated by reference numerals 25c and 25d. This feature can best be seen from FIG. 7 which illustrates the progress during the closing operation of the ear 12, whereby an intermediate position is shown in dotted lines and the approximate configuration of the ear in its closed condition in dash and dotted lines. It can be readily seen from FIG. 7 that the corner portions 14 will continue to exert a radially inwardly directed pressure on the embossment 25 as a result of the gradually rising surfaces 25a and 25b, thereby forcing the insert ring 20 against the hose (not shown), and therewith the latter against the nipple (not shown) as the corner portions 14 move toward one another. Since the surfaces 25a and 25b rise gradually, an ever-increasing pressure is exerted which assures the tightness of the clamp.

Figure 5:
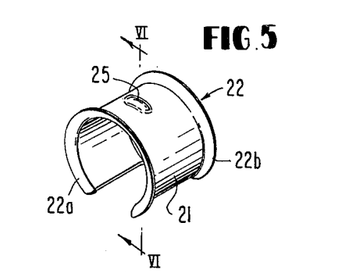
FIG. 5 is a perspective view of a ring-like insert member of relatively thin band material which is provided with one embossment in accordance with the present invention.

In order to prevent relative axial movement between the insert ring 20 and the hose clamp 10, the insert ring, like the insert ring of FIGS. 5 and 5a of my prior U.S. Pat. No. 3,303,669, may be made wider in the axial direction than the hose clamp 10. It is not necessary to bend the side portions 22a and 22b (FIG. 6) at right angle, but is suffices to bend the same at an angle α of, for example, about 30 to about 60° to achieve the same results. Moreover, it is preferable to locate the embossment 25 asymmetrically in the band, i.e., nearer one end of the band than the other, to thereby assure such position of the insert ring 20 relative to the clamp 10, that any mechanical interlock, normally located opposite the ear of a one-ear clamp, and any step formed by the overlap of the two band ends of the clamp, are covered by a part of the insert ring.

Figure 8:
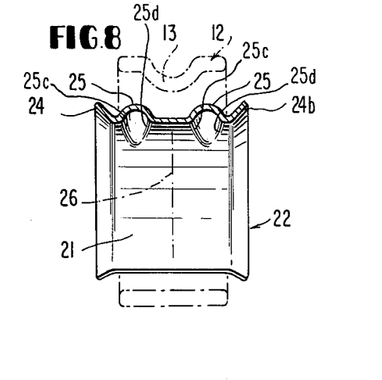
FIG. 8 is a cross-sectional view, similar to FIG. 6, illustrating a modified embodiment of an insert member in accordance with the present invention.

FIG. 8 illustrates a modified embodiment of the insert ring illustrated in FIG. 5 in which, in lieu of a centrally arranged embossment 25, two embossments 25 are provided which are spaced on both sides of the central plane 26 in such a manner as to avoid any possible interference with the reinforcing groove 13 provided in the connecting portion 12c of the ear 12 of the hose clamp. Again, the embossments are provided with external surfaces gradually increasing in height and width like the embossment 25 of FIGS. 5-7 and are preferably located asymmetrically in the insert ring.

Figure 9:
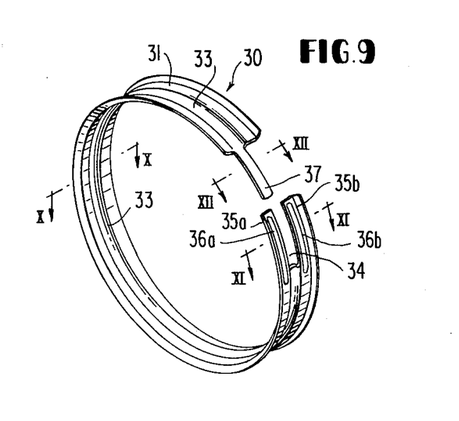
FIG. 9 is a perspective view, of a modified embodiment of a ring-like insert member in accordance with the present invention, which assures a nearly perfectly circular configuration of the insert ring under all conditions.
Figure 10:
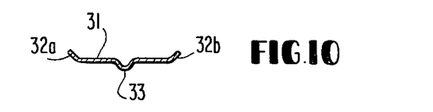
FIG. 10 is a cross-sectional view, taken along line X—X of FIG. 9.
Figure 11:
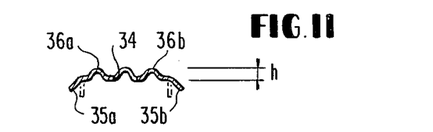
FIG. 11 is a cross-sectional view, taken along line XI—XI of FIG. 9.
Figure 12:
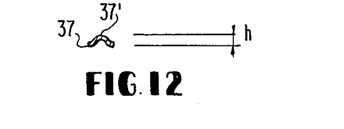
FIG. 12 is a cross-sectional view, taken along line XII—XII of FIG. 9.

The embodiment of FIG. 9 utilizes a modified ring-like insert member generally designated by reference numeral 30 which again can be made of relatively thin band material and which assures a practically perfect circular configuration under all conditions. The insert ring 30 which again includes a flat band portion 31 and bent-up side portions 32a and 32b, is provided for that purpose near one end thereof with two leg portions 35a and 35b defining therebetween an elongated opening 34. The opposite end of the insert member 30 is provided with a circumferentially extending tongue portion 37 which during contraction of the hose clamp is able to slide into the opening 34. In a particularly appropriate embodiment, an inwardly extending indentation 33 may be provided which extends circumferentially in the band portion 31 as continuation of the groove-like cross section of the tongue portion 37, from the inner end of the latter to the inner end of the opening 34. The tongue portion 37 is thereby of essentially similar cross section (FIG. 12) as the indentation 33 (FIG. 10). Additionally, the leg portions 35a and 35b are provided with inwardly extending reinforcing indentations 36a and 36b which extend in the leg portions from a point near the free end thereof into the band material of the insert ring 30 beyond the inner end of the opening 34. To prevent relative movement between the insert member 30 and the hose clamp (not shown) in the axial direction, the insert member may again be made somewhat wider in the axial direction than the hose clamp and the lateral portions 32a and 32b of the band material 31 may again be angularly bent up. FIGS. 11 and 12 show that the depth "h" of the indentations in the parts 31, 33, 37 and 36a, 36b are all about the same. The indentation 33 and/or the indentations 36a and 36b may, of course, also be omitted, if not required to reinforce the thin band material within those areas and if not needed to assure a tight clamping connection.

Figures 13, 14, 15, 16, 17, 18, 19, 20, 21, 22, 23, 24, 25, 26, 27, 28:
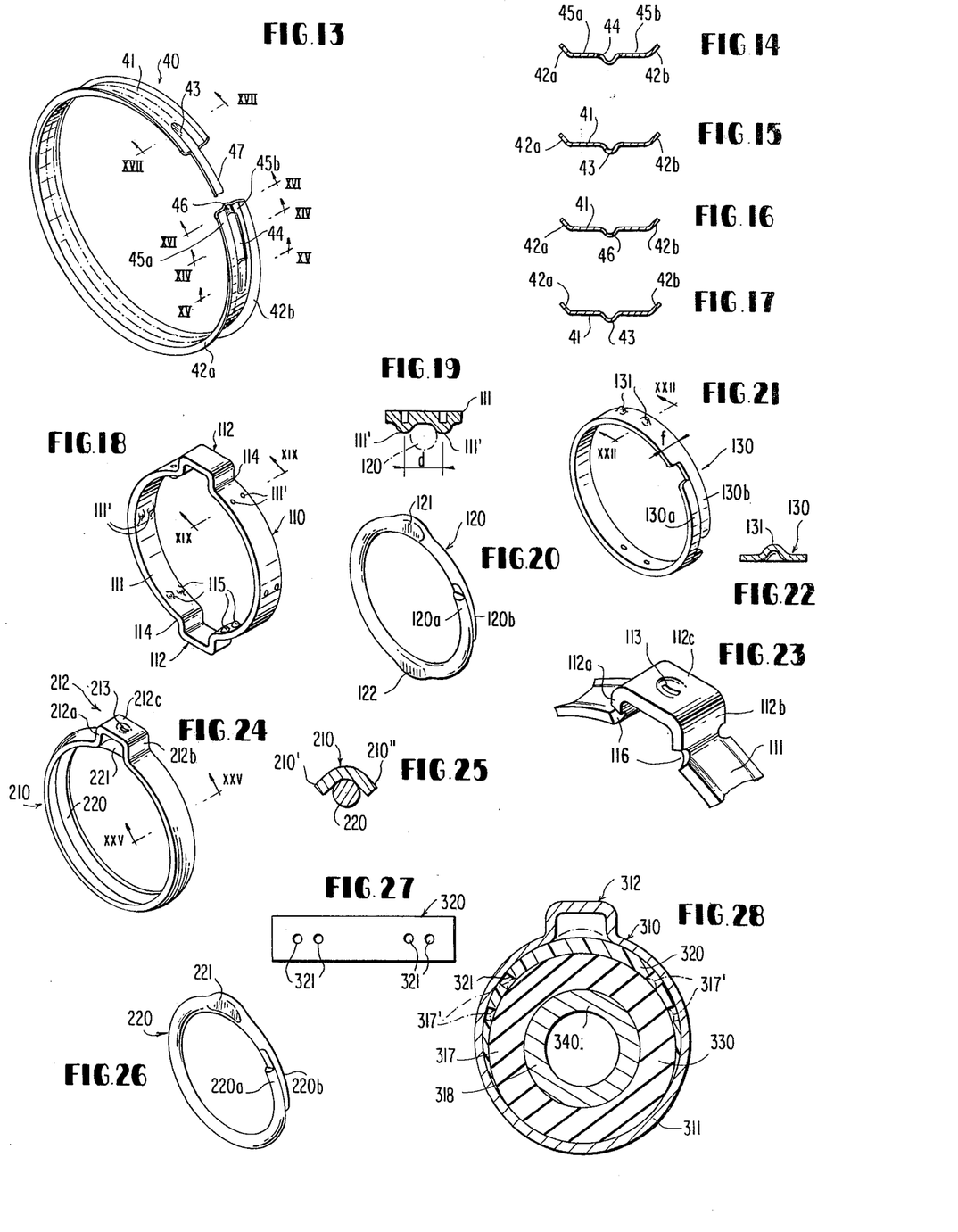
FIG. 13 is a partial perspective view of a modified embodiment of an insert member similar to FIG. 9.
FIG. 14 is a cross-sectional view taken along line XIV—XIV of FIG. 13.
FIG. 15 is a cross-sectional view taken along line XV—XV of FIG. 13.
FIG. 16 is a cross-sectional view taken along line XVI—XVI of FIG. 13.
FIG. 17 is a cross-sectional view taken along line XVII—XVII of FIG. 13.
FIG. 18 is a perspective view of a modified hose clamp with retention means according to the present invention for the insert member.
FIG. 19 is a cross-sectional view, on an enlarged scale, taken along line XIX—XIX of FIG. 18.
FIG. 20 is a perspective view of a ring-like insert member according to the present invention for use with the hose clamp shown in FIG. 18.
FIG. 21 is a perspective view of a modified ring-like insert member for use with the hose clamp shown in FIG. 18.
FIG. 22 is a cross-sectional view taken along line XXII—XXII of FIG. 21.
FIG. 23 is a partial perspective view showing a modified hose clamp ear construction in accordance with the present invention intended to prevent damage to the hose material if a narrower insert ring is used.
FIG. 24 is a perspective view of a still further modified embodiment of a one-ear hose clamp for use with the present invention.
FIG. 25 is a cross-sectional view, taken along line XXV—XXV of FIG. 24 and illustrating the hose clamp and ring-like insert member in accordance with the present invention.
FIG. 26 is a perspective view of the ring-like insert member used with the hose clamp of FIGS. 24 and 25.
FIG. 27 is a plan view on a still further modified embodiment of a ring-like insert member developed into the plane of the drawing and provided with anchoring openings according to the present invention.
FIG. 28 is a transverse cross-sectional view illustrating the assembly of a hose clamp and insert member of FIG. 27 in combination with a hose mounted on a nipple, with the various parts thereof shown in the installed condition prior to fastening the hose onto the nipple by contraction of the ear.

In FIG. 13 which illustrates a modified embodiment of the insert member illustrated in FIGS. 9 through 12, the insert ring generally designated by reference numeral 40, again includes a band portion 41 of relatively thin band material and bent-up side portions 42a and 42b. The leg portions 45a and 45b defining therebetween the elongated opening 44, in contrast to the embodiment of FIGS. 9-12, are interconnected near their free end by a web portion 46. The web portion 46 is thereby of such indented configuration as to be at least approximately complementary to the cross-sectional configuration of the tongue portion 47 which is of similar construction as the tongue portion 37 of FIG. 12. Due to the existence of the web portion 46, the reinforcing indentations 36a and 36b of FIG. 9 can be dispensed with. Moreover, it is not necessary to extend the centrally located circumferentially extending indentation 43 far beyond the end of the tongue portion 47, but it is possible to permit it to run out a short distance inwardly thereof. As shown in FIGS. 14, 15 and 16, the lateral portions 42a and 42b are again bent-up to prevent relative movement in the axial direction between the hose clamp (not shown) and the insert member 40.

The embodiment of FIG. 18 illustrates a typical Oetiker two-ear clamp generally designated by reference numeral 110, provided with two oppositely disposed ears 112 similar to the ear 12 of FIGS. 1 through 3. However, differing from the band portion 11 of FIGS. 1a and 2, the band portion 111 of FIGS. 18 and 19 is provided with a number of circumferentially distributed pairs of axially spaced, inwardly extending point-like projections or knob-like protrusions 111', which are made, for example, by cold deformation and which are spaced in the axial direction by a distance d (FIG. 19) such that an insert member shown in FIG. 19 in dash-and-dotted lines and designated by reference numeral 120 will be held in place between the knob-like projections 111' in the band portion 111.

The ring-like insert member 120 (FIG. 20) which may be used with the two-ear clamp of FIG. 18, is of generally circular configuration over most of its circumference and includes two portions 121 and 122 which form radially outwardly extending, approximately segmentally shaped protuberances, realized, for example, by outward material displacement of the insert ring 120 utilizing conventional means. For example, by utilizing a suitable flattening tool, this can be achieved without affecting the inner circular configuration of the insert ring 120. Moreover, the insert ring 120 is open and is provided with flattened-off, overlapping end portions 120a and 120b.

During tightening of the insert ring-clamp assembly by deformation of the ear 112, the corner portions 114 of each ear 112 will ride up on the segmentally shaped, outwardly extending protuberances 121 and 122, thereby causing the insert ring 120 to be pressed inwardly and thereby preventing any leakage places within the areas of the openings underneath the ears.

FIGS. 21 and 22 illustrate a modified embodiment of a ring-like insert member generally designated by reference numeral 130 which is made from flat material having a width f that is smaller than the spacing d in FIG. 19. However, in lieu of the outward material displacement of FIG. 20, the insert member 130 is provided with two outwardly extending knob-like protrusions 131 within the area of each ear, which are so spaced from one another in the circumferential direction that the corner portions 114 of the ear will ride up on these protrusions during the contraction of the ear and will thereby not only prevent an escape of the insert member into the opening underneath the ear but will also force the insert member 130 radially inwardly to assist in a tight connection. The insert ring 130 is provided again with mutually overlapping end portions 130a and 130b reduced in the axial direction. Moreover, in lieu of two knob-like protrusions 131, also a single knob-like protrusion of circular or oval configuration and of suitable size may be provided in the insert member 130 within the area of each ear to prevent the material of the insert member from being squeezed outwardly into the opening underneath an ear during contraction of the latter.

FIG. 23 shows a modified hose clamp for use, for example, in the arrangement of FIG. 18 which is provided with small cut-ins or notches 116 at the corner of each transition between a respective outwardly extending leg portion 112a and 112b and the band portion 111. This arrangement reduces the danger of damage to the hose in the presence of an insert member narrower in width than the width of the clamp due to any possible sharp edges within that area. Moreover, the cut-ins or notches 116 facilitate the bending of the circumferential band portion of the clamp, as this is done, for example, in FIGS. 14 through 17 in order to protect the hose against damage by the lateral clamp edges.

FIG. 24 illustrates a hose clamp generally designated by reference numeral 210 provided with an ear generally designated by reference numeral 212 of the typical "Oetiker" type which again consists of two outwardly extending leg portions 212a and 212b interconnected by a bridging portion 212c which in turn is provided with a longitudinal groove 213. However, whereas the hose clamps of FIGS. 1a and 18 were of flat material, the hose clamp 210 of FIG. 24 is approximately of V-shape in cross section with the side portions 210' and 210" thereof extending radially inwardly at an angle so as to accommodate therewithin at least a part of the insert member 220 which may be of any suitable shape, for example, of circular cross section as shown in FIG. 20. As is quite apparent, the modified shape of the hose clamp 210 obviates the need for any other means, as described hereinabove, to prevent relative axial movement between the insert member 220 and the hose clamp 210. The insert ring 220 which may, for example, be of the type shown in FIG. 20, is provided with only one approximately segmentally shaped outward displacement of material indicated by reference numeral 221 since the clamp 210 of FIG. 24 is provided with only one ear. The insert ring 220 is again provided with overlapping ends 220a and 220b which are suitably reduced in thickness for that purpose.

FIGS. 27 and 28 show a ring-like insert member generally designated by reference numeral 320 which, in FIG. 27, is shown substantially in the unfolded condition. The insert ring 320, which may be made of any suitable bendable material, such as synthetic resinous material or metallic material, is provided with several openings 321 suitably spaced in the circumferential direction over those parts of the insert ring which do not come to lie underneath an ear of the hose clamp.

FIG. 28 illustrates the insert ring 320 in combination with a typical hose clamp generally designated by reference numeral 310 installed over a hose 317 mounted on a nipple 318, whereby during tightening of the clamp 310 by contraction of the ear 312, the hose material will be forced into the openings 321, as indicated in dash-and-dotted lines at 317', and will thereby prevent relative movement between the insert member 320 and the hose material, thereby also precluding a displacement of the insert member 320 into the opening underneath the ear 312 while the hose 317 is tightened onto the nipple 318. Though the insert member 320 of FIG. 28 is shown wedge-shaped in cross section, it may also be made of flat, relatively thin band material, provided its thickness in relation to the hose material and the latter's elasticity is such that the hose material is able to anchor itself sufficiently in the holes 317.

Furthermore, an embossment, as shown in FIG. 5, or an outwardly extending protuberance or protuberances, as shown in FIGS. 20 or 21, may also be provided within the area of the insert member that comes to lie over the mechanical interlock of the free ends of the clamp, when the latter is made as described in my U.S. Pat. No. 3,286,314. The embossment and protuberances, of which also a single one of approximately circular or oval shape would suffice, thereby assure a complete tightness also within the area of such mechanical interlock, even at relatively higher pressures, since each such embossment or protuberance would increase the inward pressure exerted on the hose during contraction of an ear, even if a small step should exist in the clamp within that area due to an overlap of the free ends of the band, from which the clamp is made.

It can thus be seen that the present invention provides an insert member which effectively precludes any leakage places owing to the fact that the insert member is forcibly pressed inwardly against the hose within each endangered area, especially within the area of an opening underneath a respective ear, while the ear is being deformed to tighten the hose clamp over the hose and thereby fasten the latter onto a nipple.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An open-ring-like insert member adapted to be assembled on the inside of a hose clamp of the type provided with a band means having a circumferential band portion and with at least one ear means projecting outwardly from the band means and operable to be deformed to tighten thereby the clamp about an object to be fastened, characterized in that the insert member comprises at least one outwardly projecting embossment means which extends generally in the circumferential direction and has external surfaces gradually increasing in height in the radially outward direction from each end thereof so that said outwardly projecting means of the insert member, when placed underneath the opening of an uncontracted ear means of a hose clamp, is operable to be pressed inwardly by the corner portions forming the transitions from the respective ear means into the band portion during deformation of the ear means which causes the corner portions to move toward one another and to thereby engage said external surfaces of the outwardly projecting embossment means with increasing inwardly directed forces in order to prevent the portion of the insert member underneath a respective ear means from escaping outwardly into the opening within the area of the ear means during contraction of the latter and thereby to prevent any leakage place within the area of said ear means.

2. An insert member according to claim 1, characterized in that said insert member is made of relatively thin band material.

3. An insert member according to claim 2, characterized in that said material has a thickness not exceeding about 0.3 mm.

4. An insert member according to claim 2 or 3, characterized in that said material is hard-rolled stainless steel.

5. An insert member according to claim 1, characterized in that the insert member is of such length that it extends over at least half the circumference of a hose clamp, when installed on the inside of the latter.

6. An insert member according to claim 1, characterized in that the insert member is provided with further means substantially preventing the insert member from axial movement relative to the clamp.

7. An insert member having a band portion with an essentially flat surface portion in the axial direction according to claim 6, characterized in that said further means includes a lateral portion on each side of the flat surface portion, the lateral portions extending in the outward direction away from the axis of the clamp and forming an angle with the flat surface portion.

8. An insert member according to claim 7, characterized in that said angle is about 30° to about 60°.

9. An insert member according to claim 1, characterized in that said embossment means is located approximately midway of the insert member width in the axial direction.

10. An insert member according to claim 1, characterized in that two embossment means are provided which are located to both sides of a center plane passing through the insert member at right angle to its axial direction.

11. An insert member according to claim 1, 9 or 10, characterized in that a respective embossment means extends generally in the circumferential direction and is of a length in the circumferential direction at most equal to the width of the circumferential opening, when assembled underneath a corresponding ear means in the uncontracted condition thereof so that said corner portions engage said embossment means substantially only during contraction of the ear means.

12. An insert member according to claim 11, characterized in that the embossment means is located asymmetrically in the circumferential direction of the insert member by being nearer one end of the insert member than the other end thereof.

13. An insert member according to claim 1, characterized in that said embossment means includes at least two outwardly extending, knob-like protrusions spaced from one another in the circumferential direction a distance at most equal to the opening of an uncontracted means means of a hose clamp to which the insert member is adapted to be assembled, so that the insert member is pressed inwardly by engagement of said corner portions with the knob-like protrusions during deformation of the ear means when the corner portions are forced toward one another.

14. An insert member according to claim 1, characterized in that the embossment means includes at least one outwardly protruding portion which is provided in the insert member inwardly of and within the area of each deformable ear means.

15. An insert member according to claim 14, characterized in that a single outwardly protruding portion of approximately circular or oval shape is provided as embossment means within the area of each ear means.

16. An insert member according to claim 14, characterized in that two outwardly protruding portions each of approximately circular or oval shape are provided as embossment means within the area of each ear means.

17. An insert member according to claim 14, characterized in that the first-mentioned means includes an approximately segmentally shaped, outwardly protruding portion within the area of each ear means.

18. An insert member according to claim 14, characterized in that the outwardly protruding portion is of groove-like cross section, extends generally in the circumferential direction and has a length in the circumferential direction at most equal to the width of an opening underneath a corresponding ear means in the uncontracted condition of the latter.

19. A hose clamp and insert member assembly according to claim 14, characterized in that the first-mentioned means is provided in the insert member nearer one end thereof than the other.

20. In combination with a hose clamp of the type provided with a band means having a circumferential band portion and with at least one ear means projecting outwardly from the band means and operable to be deformed by contraction to tighten the clamp about an object to be fastened, an open ring-like insert member assembled to said hose clamp on the inside thereof and comprising at least one outwardly projecting embossment means located within the area of the opening underneath a respective ear means and extending generally in the circumferential direction, said outwardly projecting embossment means having external surfaces gradually increasing in height in the radially outward direction from each end thereof, so that the insert member is pressed inwardly within the area of the corresponding opening by engagement of the corner portions forming the transitions from the respective ear means into the band portion, with the outwardly projecting embossment means during deformation of the ear means which causes the corner portions to move toward one another and to thereby engage said external surfaces of the outwardly projecting embossment means with increasing inwardly directed forces in order to prevent the portion of the insert member underneath a respective ear means from escaping outwardly into the opening within the area of the ear means during contraction of the latter and thereby prevent any leakage place within the area of said ear means.

21. A hose clamp and insert member assembly according to claim 20, characterized in that the assembly is provided with further means retaining the insert member relative to the hose clamp in the axial direction.

22. The combination according to claim 20, characterized in that the insert member is of at least approximately circular configuration, and in that an outwardly projecting embossment means is provided in the insert member for each ear means by material displacement of the band means in the generally radially outward direction.

23. A hose clamp and insert member assembly according to claim 20 or 22, characterized in that each deformable ear means includes two outwardly extending leg portions and a connecting portion interconnecting the leg portions which is provided with a reinforcing groove extending generally in the circumferential direction in the connecting portion.

24. An insert member according to claim 20 or 22, characterized in that each outwardly projecting embossment means is of approximately segmental shape of a length in the circumferential direction at most essentially equal to the circumferential opening underneath the uncontracted ear means.

25. An insert member according to claim 24, characterized in that said insert member has flattened overlapping end portions.

26. The combination of an open ring-like insert member made of band material and of a hose clamp of the type provided with a circumferential band means and with at least one ear means projecting outwardly from the band means and adapted to be deformed so as to tighten the clamp about an object to be fastened, characterized by at least one outwardly projecting embossment means extending generally in the circumferential direction in said insert member, said embossment means being of a length in the circumferential direction slightly shorter than the width of the circumferential opening of the ear means in the uncontracted condition and having external surfaces gradually increasing in height from each end of the embossment means and being operable to be pressed firmly inwardly by the corner portions forming the transitions from the respective ear means into the band means upon deformation of the ear means which causes the corner portions to move toward one another and thereby ride up and engage said external surfaces of the outwardly projecting embossment means to thereby prevent the portion of the insert member underneath a respective ear means from escaping into the opening within the area of the ear means during contraction of the latter and thereby to preclude with certainty any leakage within the area underneath the ear means even if relatively thin band material is used for the insert member.

27. An open ring-like insert member made of band material adapted to be assembled to the inside of a hose clamp of the type provided with a circumferential band means and with at least one ear means projecting outwardly from the band means and operable to be deformed so as to tighten the clamp about an object to be fastened, characterized in that the insert member comprises at least one outwardly projecting embossment means extending generally in the circumferential direction in said insert member, said embossment means being of a length in the circumferential direction slightly shorter than the width of the circumferential opening of an ear means in the uncontracted condition thereof and having external surfaces gradually increasing in height and width from each end of the embossment means so that said outwardly projecting embossment means of the insert member, when placed underneath the opening of an uncontracted ear means, is operable to be pressed firmly inwardly by the corner portions forming the transitions from the respective ear means into the band means upon deformation of the ear means which causes the corner portions to move toward one another and thereby ride up and engage said external surfaces of the outwardly projecting embossment means to thereby prevent the portion of the insert member underneath a respective ear means from escaping into the opening within the area of the ear means during contraction of the latter and thereby to preclude with certainty any leakage within the area underneath the ear means even if relatively thin band material is used for the insert member.

28. The combination of an open ring-like insert member made of relatively thin band material and of a hose clamp of the type provided with a circumferential band portion and with at least one ear means projecting outwardly from the band means and adapted to be deformed so as to tighten the clamp about an object to be fastened, characterized by at least one outwardly projecting embossment means in said insert member which extends generally in the circumferential direction and has external surfaces gradually increasing in height and width from each end thereof and which is operable to be pressed inwardly, when placed underneath the opening of an uncontracted ear means, by the corner portions forming the transitions from the respective ear means into the band portion during deformation of the ear means which causes the corner portions to move toward one another and to thereby engage said external surfaces of the outwardly projecting embossment means with increasing inwardly directed forces in order to prevent the portion of the insert member underneath a respective ear means from escaping outwardly into the opening within the area of the ear means during contraction of the latter and thereby to prevent any leakage place within the area of said ear means.

* * * * *

UNITED STATES PATENT AND TRADEMARK OFFICE
CERTIFICATE OF CORRECTION

PATENT NO. : 4,312,101
DATED : January 26, 1982
INVENTOR(S) : Hans Oetiker

It is certified that error appears in the above—identified patent and that said Letters Patent is hereby corrected as shown below:

Column 11, line 35, change "means means" to --ear means--

Signed and Sealed this

Sixteenth Day of November 1982

[SEAL]

Attest:

GERALD J MOSSINGHOFF

Attesting Officer

Commissioner of Patents and Trademarks